Figure 1:
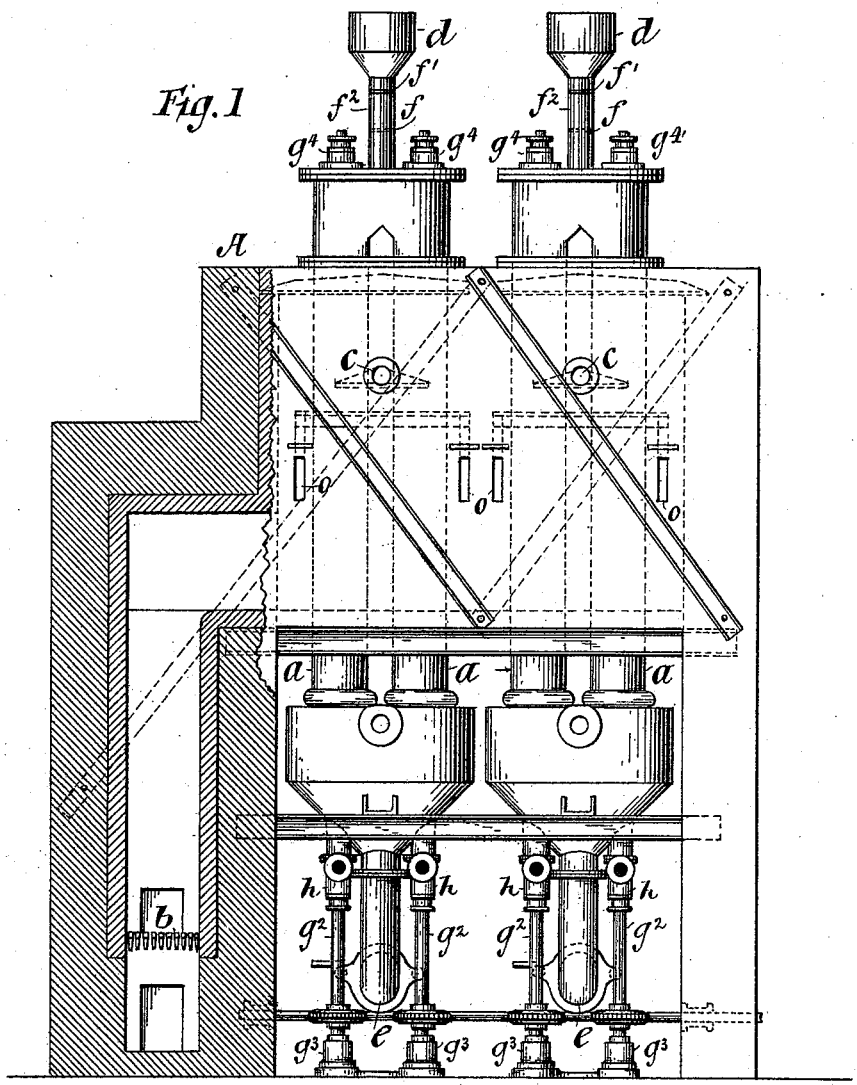

(No Model.) 2 Sheets—Sheet 1.

L. STERNBERG.
PROCESS OF MAKING AMMONIA.

No. 523,819. Patented July 31, 1894.

Witnesses
Geo. Wadman
A. M. Jones

Inventor
Lothar Sternberg (No Model.) 2 Sheets—Sheet 2.

L. STERNBERG.
PROCESS OF MAKING AMMONIA.

No. 523,819. Patented July 31, 1894.

Witnesses
Geo. Wadman
A. M. Jones.

Inventor
Lothar Sternberg

UNITED STATES PATENT OFFICE.

LOTHAR STERNBERG, OF JERSEY CITY, NEW JERSEY.

PROCESS OF MAKING AMMONIA.

SPECIFICATION forming part of Letters Patent No. 523,819, dated July 31, 1894.

Application filed November 2, 1892. Serial No. 450,760. (No specimens.)

*To all whom it may concern:*

Be it known that I, LOTHAR STERNBERG, a subject of the Emperor of Germany, residing in Jersey City, New Jersey, have invented a certain Improvement in Processes of Obtaining Ammonia and Ammonia Salts from Nitrogenous Organic Matters, of which the following is a specification It is a known fact that the nitrogen contained in nitrogenous organic materials may be more or less completely transformed into ammonia by calcining such substances in a retort or similar apparatus in an atmosphere of superheated steam. The theoretical amount of steam necessary for the required chemical reactions is not large, though of course different with different materials, but in all processes founded on this fact, the quantity of steam required in practice, in order to obtain a sufficient yield of ammonia from a given amount of nitrogenous organic matter, is very considerable, being sometimes twenty to thirty times the amount of the substance to be treated. Such large excess of steam has heretofore been necessarily employed principally to dilute the ammonia as soon as formed, and to remove it as quickly as possible from the retort or generating apparatus and from the effect of the heat therein in order to protect it from decomposition. The necessity for this dilution and quick removal of the ammonia arises partly from the small difference which exists between the temperature at which the ammonia is formed and the temperature at which it is again decomposed and also from the fact that such decomposition takes place more easily and at a lower temperature if the ammonia is in a more concentrated condition, than it does when the ammonia is highly diluted.

I have found that the quantity of steam can be reduced considerably and thus a large economy secured by mixing with the steam, before its introduction into the retort, a non-oxidating gas or mixture of gases, such as hydrogen, nitrogen, carbonic oxide, carbonic acid, illuminating gas, water gas, and so on, these gases performing the function of the excess of steam in protecting the ammonia, when formed, from decomposition. Oxidating gases, such as air, on the contrary, are obnoxious if present in any large amount, and will accelerate the decomposition of the ammonia. In preference I use the gases which are generated in the process itself, and which are similar in composition to the gas known as water gas, by introducing them again into the generating retort after previously freeing them from ammonia by sulphuric acid. If sufficient care be taken to prevent the condensation of the excess of steam contained in the vapors from the retort there will require to be supplied of new steam little more than the quantity of steam actually consumed in the production of the ammonia and the other gases.

My process can be applied to any substance containing nitrogenous organic compounds, for instance, to animal refuse, such as hair, wool, bones, skin, hides, blood, &c., or mineral matters, such as peat, bog, or other bituminous matters, or refuse from manufacturing processes, such as waste-lye resulting from the extraction of sugar or the manufacture of alcohol from molasses, &c.

There are a variety of forms of retorts and furnaces which may be employed in carrying out my invention, but I have devised, and prefer to use, the particular form of apparatus shown in the accompanying drawings.

The said apparatus, which is herein shown merely for the purpose of illustration, embodies certain improvements shown and described in my pending application for Letters Patent therefor, Serial No. 488,585, filed October 19, 1894.

Figure 2:
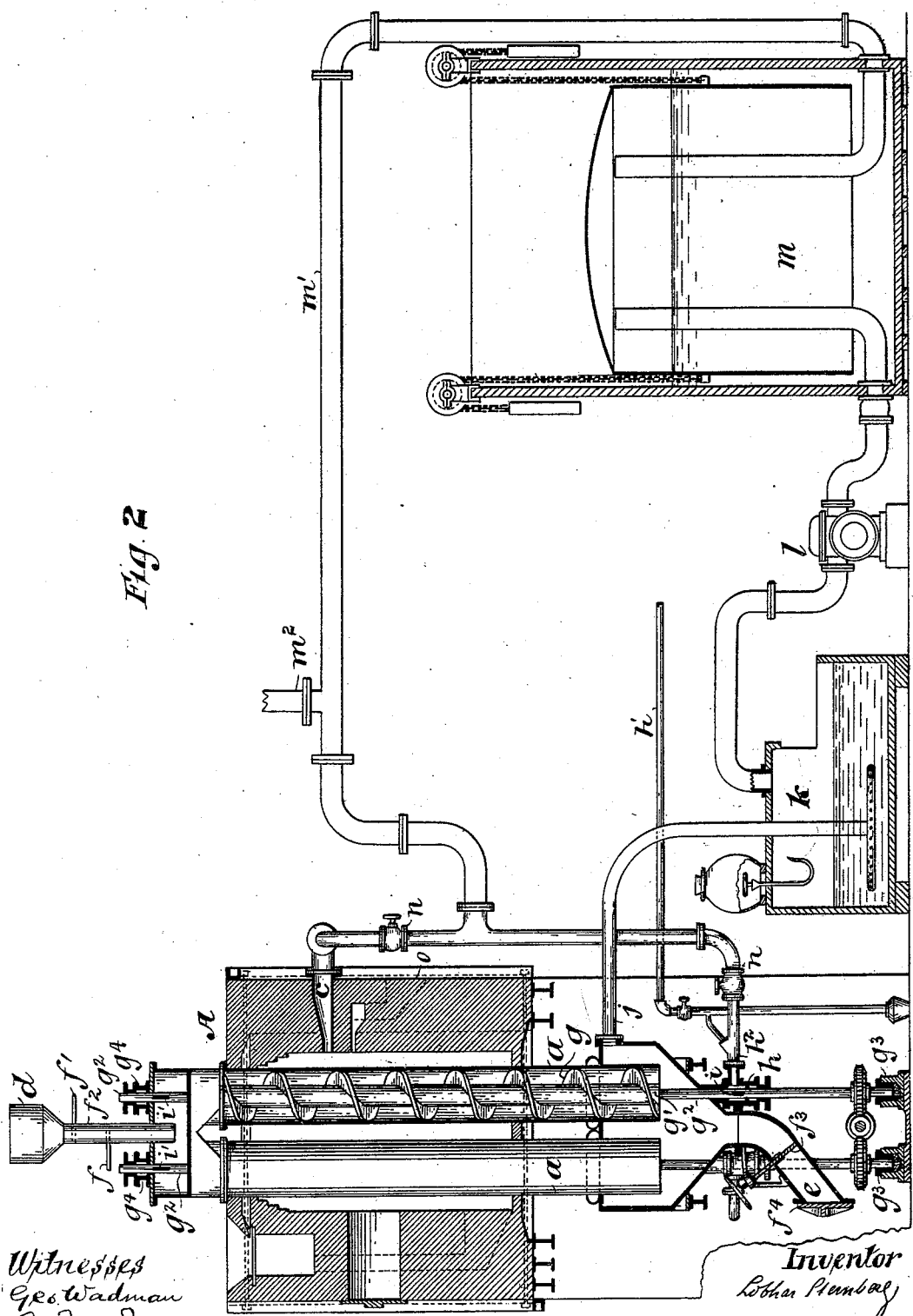

The drawings are as follows: Figure 1 is an end elevation partly in section. Fig. 2 is a longitudinal vertical section.

The drawings represent a furnace, A, containing eight vertical retorts, a, arranged in groups of four. The number of retorts, however, and their sizes may be varied as required.

The furnace may be heated either by fire upon the grate, b, or by the combustion of gas introduced through the inlet c.

In operation the supply of gas produced by the process may be sufficient for heating the retorts, but at the commencement of the operation, if no gas from any source is available, heat may be obtained from the fire upon the grate.

The four retorts are preferably united in one group or system, each group having a common inlet, $d$, at the top, and a common outlet, $e$, at the bottom for the introduction and discharge of the organic matter operated upon. Each inlet is provided with two slide valves, $ff'$, the space between the slide valves constituting the feed chamber, $f^2$, and each outlet is provided with the slide valve, $f^3$, and the cap, $f^4$, for the purpose of preventing the outside air from coming into contact with the glowing mass within the retorts whenever a fresh charge of material is introduced into the retorts or the exhausted material drawn off therefrom.

If a fluid organic matter is to be treated it must, previous to its introduction into the retort, be transferred into a solid porous body in the manner practiced in obtaining ammonia and other salts present in molasses, as described in Letters Patent of the United States No. 486,647.

Each retort is provided with a vertical screw of coarse pitch, the thread, $g$, of which winds spirally around and is affixed to the cylindrical shell, $g'$, through which is inserted the hollow shaft, $g^2$, stopped at its lower end in the bearing, $g^3$, and having its uppermost bearing in the stuffing box, $g^4$, and having an intermediate bearing in the hollow stuffing box $h$.

The portion of the hollow shaft, $g^2$, contained within the hollow stuffing box, $h$, is provided with the perforation $i$. Non-oxidizing gases mixed with steam supplied from the steam pipe, $h'$, are fed by the pipe, $h^2$, into the hollow stuffing box, $h$, and thence into the hollow shaft $g^2$, through the perforation, $i$, and are discharged therefrom near the upper end of the shaft through the perforation, $i'$, into the chamber at the upper end of the retort. The steam and non-oxidizing gases thus introduced are superheated within the shaft, and to some extent cool the shaft and preserve the screw from being destroyed by the heat within the retort.

The gases and vapors issue from the retort into the pipe, $j$, by which they are conducted into the absorber, $k$, which is of common construction, wherein by contact with sulphuric acid the ammonia is absorbed and transformed into sulphate of ammonia. The gases freed from the ammonia are drawn from the upper part of the absorber by means of the gas pump, $l$, and are forced thereby either into the gasometer, $m$, if the gas is in excess, or by suitably regulating the valves, $n\ n'$, are forced into the hollow shaft, $g^2$, or into the gas inlet discharge, $c$, or into both the gas inlet, $c$, and the hollow shaft $g^2$.

The gas introduced into the furnace through the inlet, $c$, is used to heat the retort as described, by being burned with air which is introduced into the furnace through the inlet $o$.

It will be perceived that the relative quantity of gas introduced into the retorts and burned in the furnace can be suitably regulated by operating the valves, $n, n'$. Steam for mixture with the gases introduced into the hollow shaft, $g^2$, is supplied by the steam service pipe $h'$.

The gasometer affords the means of regulating the pressure with which the gas is delivered, and the gasometer takes up any excess of gas which may be produced at any time. The pipe, $m'$, leading from the gasometer is provided with the branch, $m^2$, for connection with a pipe for conducting the gas off for any other desired purpose.

I preferably conduct the process continuously, in which case the steam and the non-oxidating gases enter the retort at the end remotest from the fire and are conducted in the same direction as the nitrogenous organic matter beyond the hottest spot in the retort. In this way the volatile nitrogenous bases, which in some cases may be generated in the colder parts of the retort, will be transformed into ammonia, when passing the glowing, porous, almost exhausted material in the hotter parts of the retort.

The gases and vapors discharged from the retort are freed from the ammonia in the usual manner by treatment with sulphuric acid and are immediately reintroduced into the generating retort. When passing the absorbing solution, the hot gases will take up so much steam by evaporation from the solution that the quantity of steam so obtained will ordinarily be sufficient for the continuance of the process. It will of course be understood that steam from some other source will be supplied when the process is started as well as at any time thereafter when needed.

Where the gases re-enter the retort, a certain pressure will exist. To prevent this pressure from becoming too high, an ordinary safety valve is provided and the excess of gas that is generated in the retort may be conducted to a gasometer and used for heating the retorts or for any other purpose.

What I claim as my invention is—

1. The method of producing ammonia from nitrogenous organic matters by calcining such matters in a retort in an atmosphere partially composed of steam and partially of non-oxidating gas or gases.

2. The method of producing ammonia from nitrogenous organic matters by calcining such matters in a retort in an atmosphere partially composed of steam and partially of hot non-oxidating gas or gases, and consisting of the residue of the vapors discharged from the retort after said vapors have been freed from ammonia by treatment with sulphuric acid in the usual manner.

LOTHAR STERNBERG.

Witnesses:
O. H. KRAUSE,
ROBT. WELLER.